US008001643B1

(12) United States Patent
James

(10) Patent No.: US 8,001,643 B1
(45) Date of Patent: Aug. 23, 2011

(54) CABLE PROTECTOR

(76) Inventor: Michael H. James, Marigouin, LA (US)

(*) Notice: Subject to any disclaimer, the term of this patent is extended or adjusted under 35 U.S.C. 154(b) by 38 days.

(21) Appl. No.: 12/720,441

(22) Filed: Mar. 9, 2010

Related U.S. Application Data

(60) Provisional application No. 61/161,970, filed on Mar. 20, 2009.

(51) Int. Cl.
  *H02G 3/30* (2006.01)
(52) U.S. Cl. .......... 14/69.5; 174/68.1; 174/101
(58) Field of Classification Search .......... None
  See application file for complete search history.

(56) References Cited

U.S. PATENT DOCUMENTS

| | | | | |
|---|---|---|---|---|
| 585,540 | A * | 6/1897 | Spangler | 104/275 |
| 5,267,367 | A * | 12/1993 | Wegmann, Jr. | 14/69.5 |
| 6,067,681 | A * | 5/2000 | Zeinstra et al. | 14/69.5 |
| 6,499,410 | B1 * | 12/2002 | Berardi | 104/275 |
| 6,747,212 | B1 * | 6/2004 | Henry | 174/101 |
| 7,595,450 | B2 * | 9/2009 | Lubanski | 174/97 |
| 7,810,197 | B1 * | 10/2010 | Anthony | 14/69.5 |

* cited by examiner

*Primary Examiner* — Raymond Addie

(57) ABSTRACT

A cable protector and access ramp apparatus and system are disclosed. The apparatus and system is comprised of a plurality of variously configured cable protector sections. Each of the sections has a protected raceway through which various piping, electrical, gas, communication and other service lines may be directed and front and rear ramps to allow vehicles to roll up and over the protected raceway. The raceway in each of the sections of the apparatus and system has a hinged cover which may be lifted to allow placement and access to the service lines. The front and rear ramps of each of the sections may be provided with a pivoting ramp cover having a slot configured to allow access to lifting channels in the frame. The lifting channels are configured to receive the tines of a forklift.

20 Claims, 19 Drawing Sheets

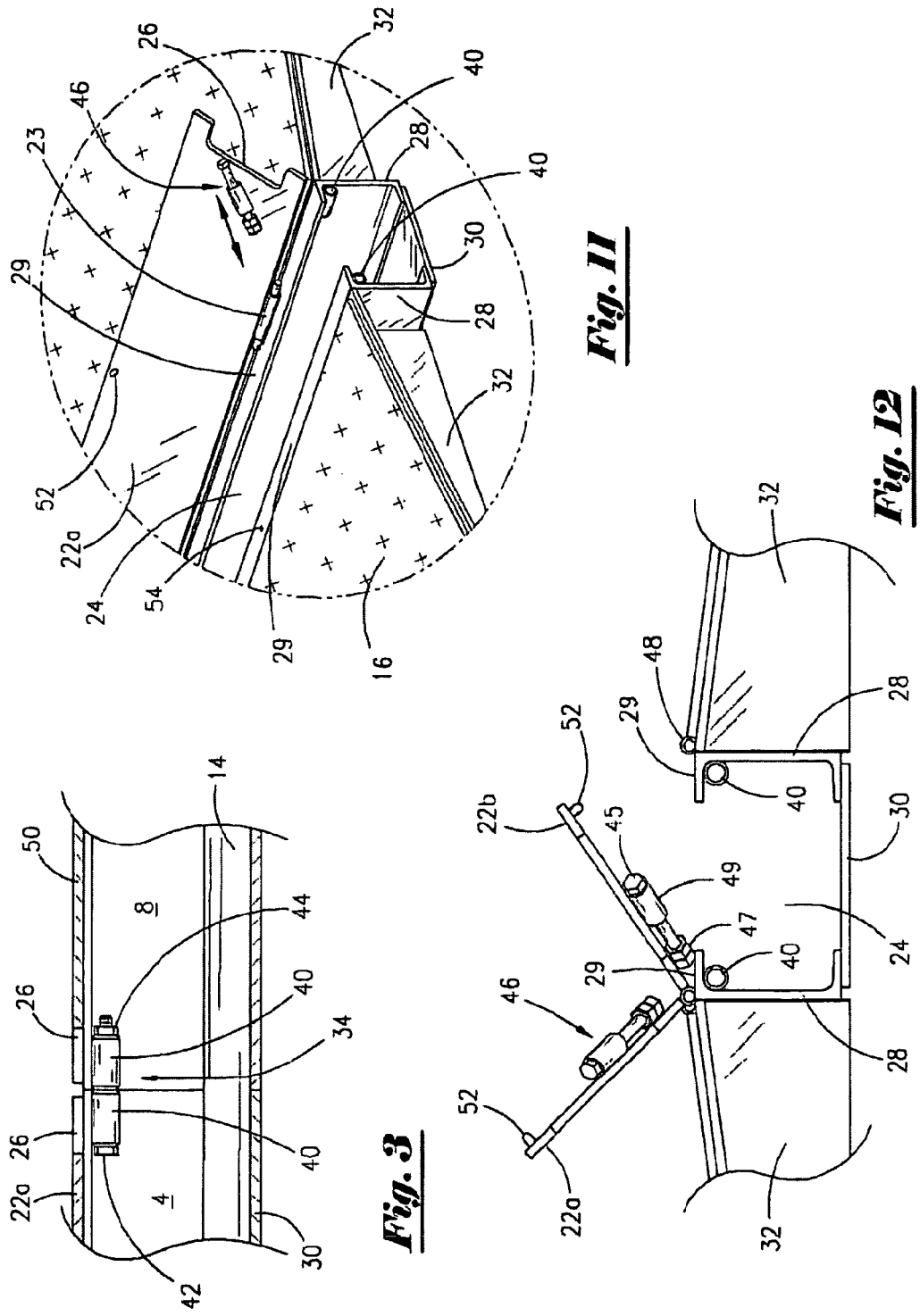

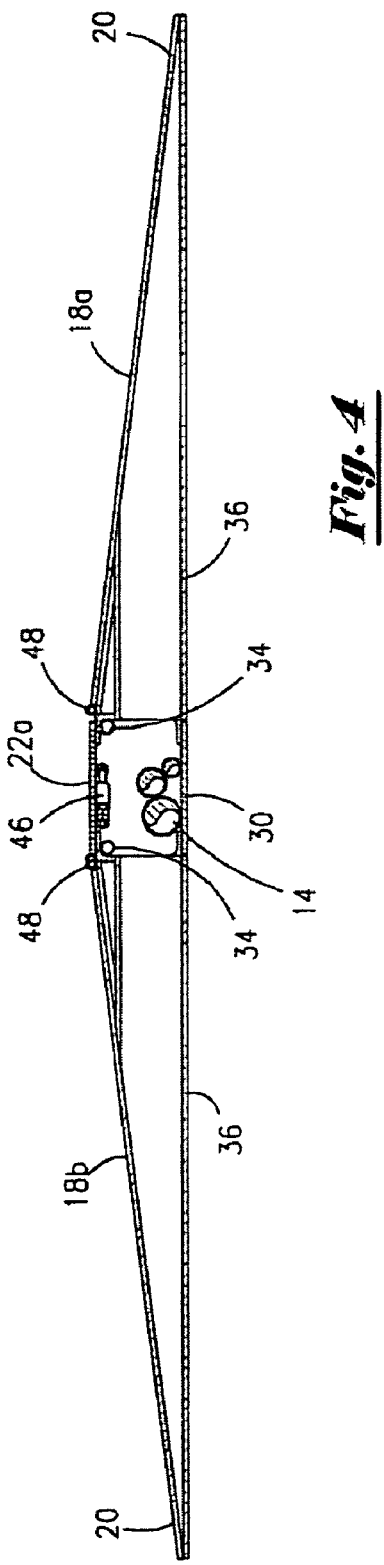
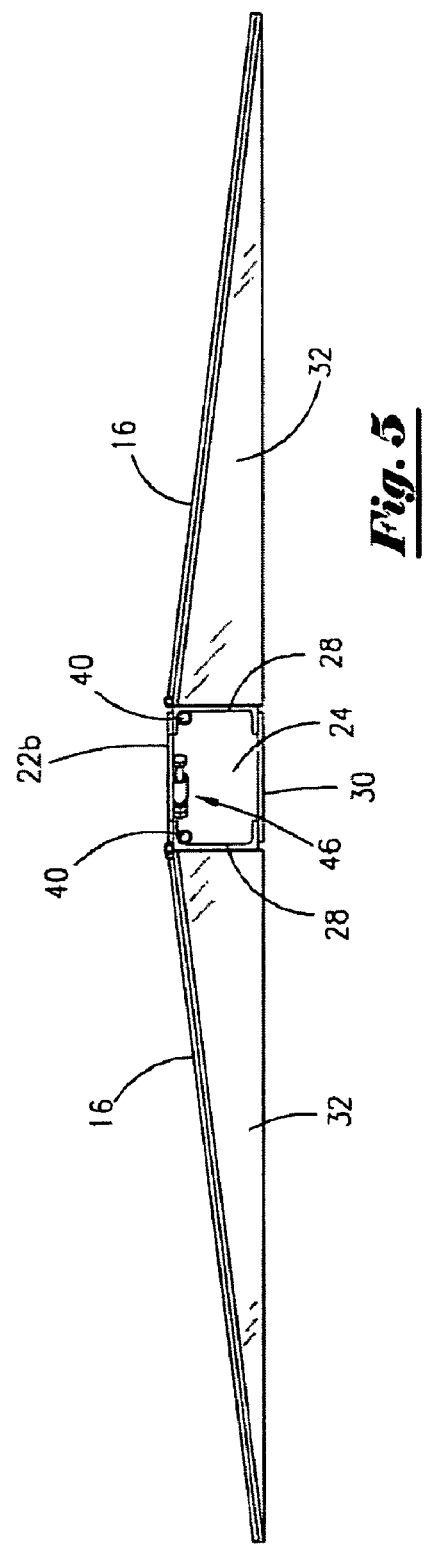

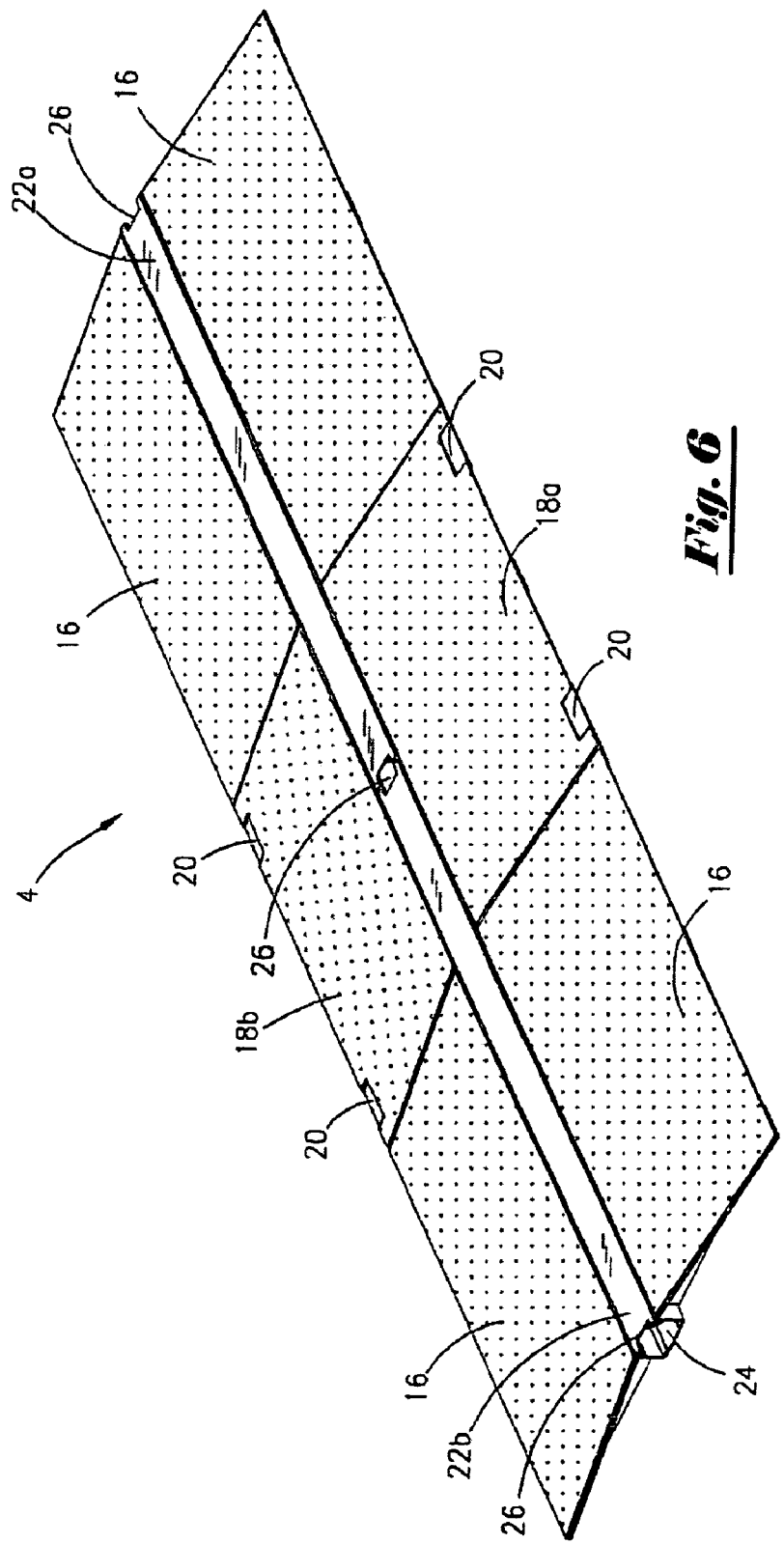

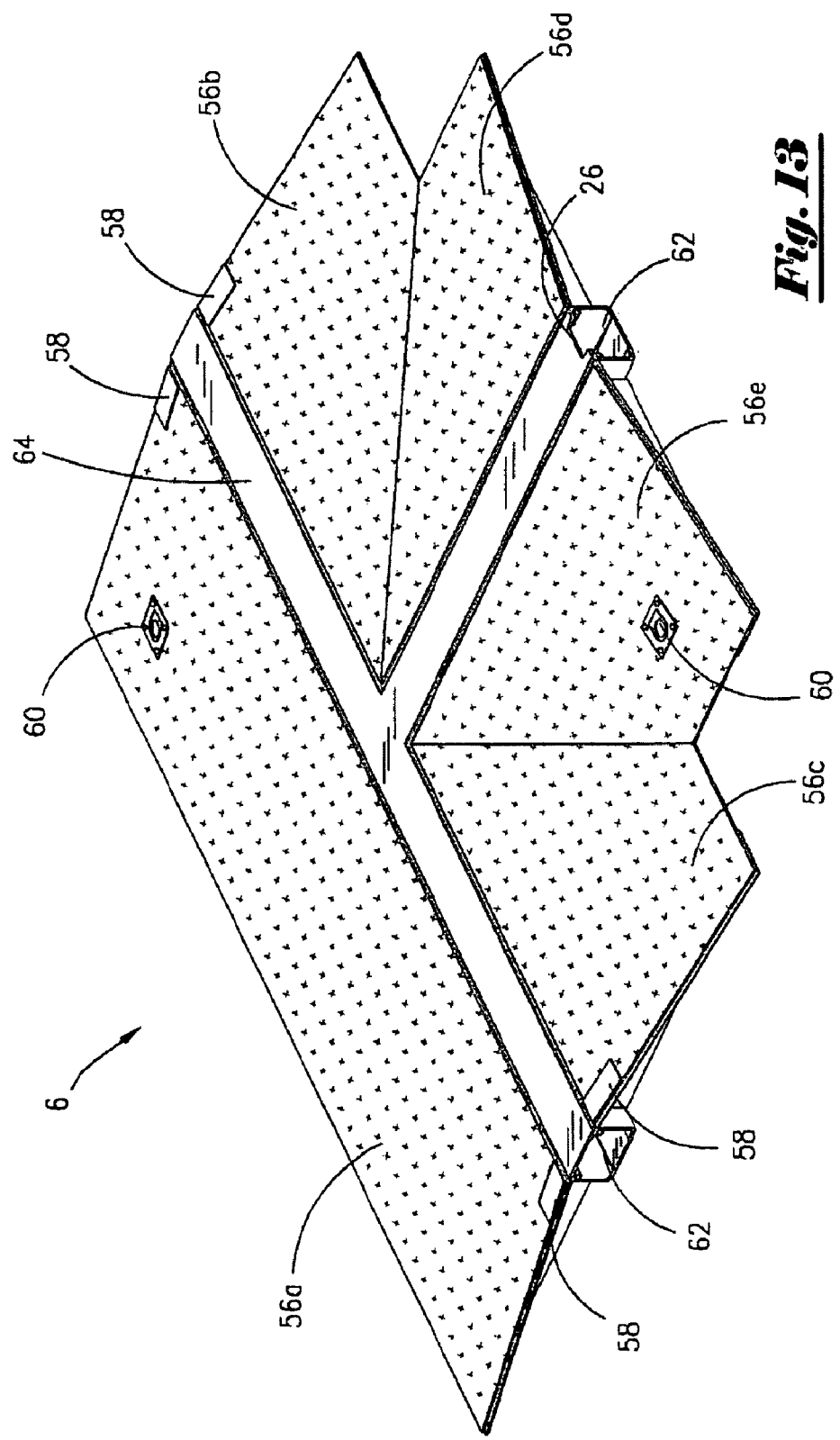

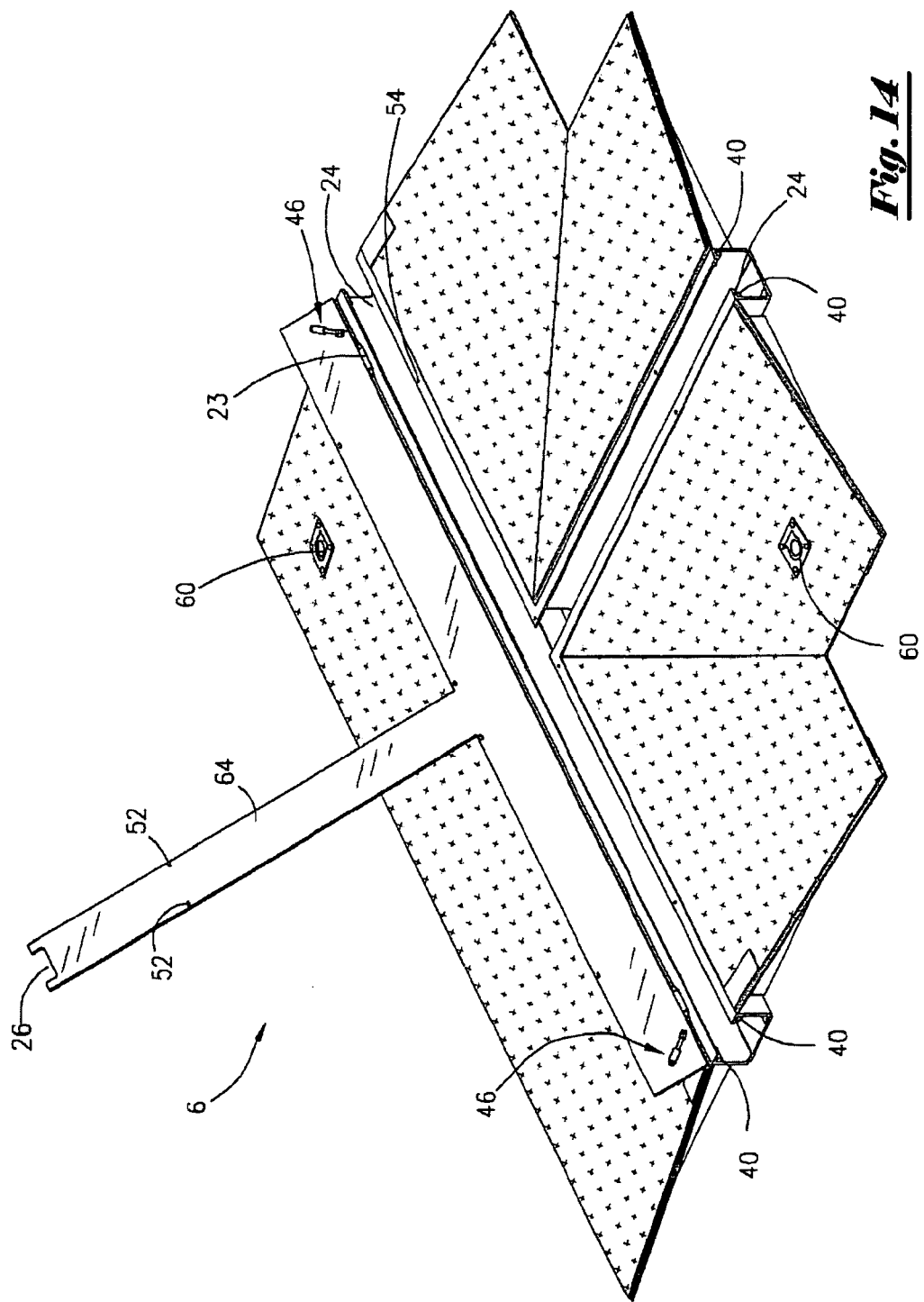

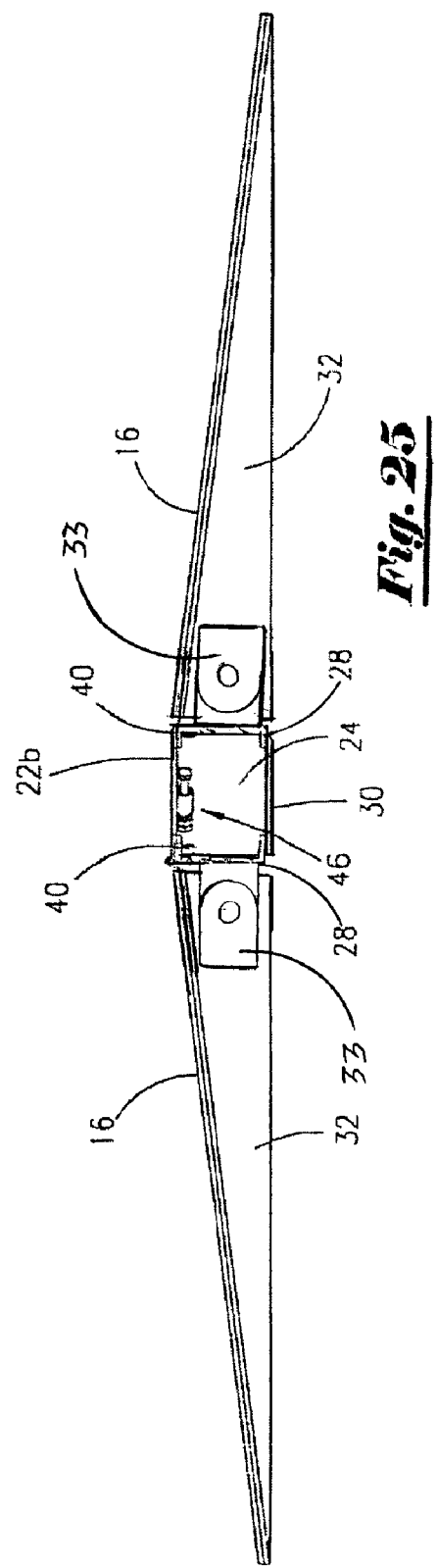

CABLE PROTECTOR

This application claims priority to U.S. provisional application Ser. No. 61/161,970 filed Mar. 20, 2009, the entire content of which is hereby incorporated by reference.

FIELD OF INVENTION

This invention relates to a portable cable protector and system to provide for vehicular traffic over temporary service lines such as electrical cables, piping, hoses and the like.

BACKGROUND OF INVENTION

Ship yards, refineries, chemical plants, power plants and other industrial facilities typically require the installation and use of temporary service lines such as temporary electrical cables, piping, hoses and the like. Often these temporary service lines are laid directly upon floor surfaces, roadways, parking lots, driveways, and other vehicle passageways. These services lines, though temporary, may remain in place once laid for an indefinite period of time. Consequently, a need exists for a portable apparatus that will allow the passage of vehicles, especially heavy vehicles, over such temporary service lines and to restrict such passage as may be necessary.

SUMMARY OF INVENTION

The present invention provides a portable cable protector apparatus and system to provide a protected raceway for service lines which may consist of a variety of electrical cables, communication cables, piping, hoses, or other service line conduit. The apparatus described includes a vehicle ramp to allow vehicles to roll up and over the protected the service line raceway and any service lines included in the protected raceway.

The apparatus and system is comprised of a plurality of variously configured cable protector sections, each section having a protected raceway of service lines and front and rear ramps to allow vehicles to roll up and over the protected raceway.

The covers of the front and rear ramps of each of the sections of the cable protector apparatus may be hinged at the top of the raceway to allow the covers of the vehicle ramps to be pivoted on the hinges. These hinged ramp covers may be provided with forklift tine access slots to allow access to lifting channels in the ramp frame that are configured to receive the tines of a forklift. These lifting channels are generally covered by the hinged covers of the ramps when the covers of the ramps are in a down position to allow traffic flow over the top of the ramps. The access slots in the hinged covers of the ramps allow the covers to be easily lifted at the edges of the ramps by the tines of a forklift for insertion of the forklift tines into the lifting channels. This configuration allows the ramp sections to be readily moved by forklift to a desired location.

The variously configured sections of the cable protector apparatus and system will allow a protected raceway with crossing ramps to be configured and arranged as desired so that service lines may be directed to and protected along a desired course.

The various ramp sections are easily assembled and disassembled. This will allow a cable protector system to be assembled from the various sections as may be desired. The various sections are readily movable to a desired location by forklift or other lifting means.

Because the covers of the ramps of each section may be configured to pivot up and down on hinges, the covers on the ramps of each section or a desired section of the apparatus may be lowered to allow vehicles to roll up and over the protected service lines or lifted as desired to provide a barrier to restrict vehicle access across the protected service line raceway. This feature allows the ramps to be used as a security or traffic control apparatus as well as a cable protector.

Because of its portability and ease of installation and setup, the cable protector apparatus and system is particularly suitable for use in shipyards and chemical plants.

It is thought that each of the various sections of the cable protector apparatus and system will be constructed from structural steel components and that the ramps will have non-skid surfaces. However, other types of materials and metals might be utilized to construct the various sections, including polymer materials, all depending upon the intended use of the cable protector apparatus and system.

BRIEF DESCRIPTION OF THE DRAWINGS

FIG. 3 is a partial cross-section view of the locking component of the cable protector apparatus and system of FIG. 1.

FIG. 4 is a cross-section view of the forklift slot of the cable protector apparatus and system of FIG. 1.

FIG. 5 is a cross-section view of the ramp and raceway of the cable protector apparatus and system of FIG. 1.

FIG. 6 is a top perspective view of the linear components of the cable protector apparatus and system of FIG. 1.

FIG. 11 is enlarged partial perspective view of the service line raceway.

FIG. 12 is a partial cross-section view of the service line raceway of the cable protector apparatus and system of FIG. 1.

FIG. 13 is a perspective view of a T-intersection component of the cable protector apparatus and system of FIG. 1.

FIG. 14 is a perspective view of the component of FIG. 13 showing the raceway cover in an open position.

FIG. 25 is a cross-sectional view of an alternate embodiment of the cable protector apparatus.

DESCRIPTION OF THE EMBODIMENT

Figure 1:
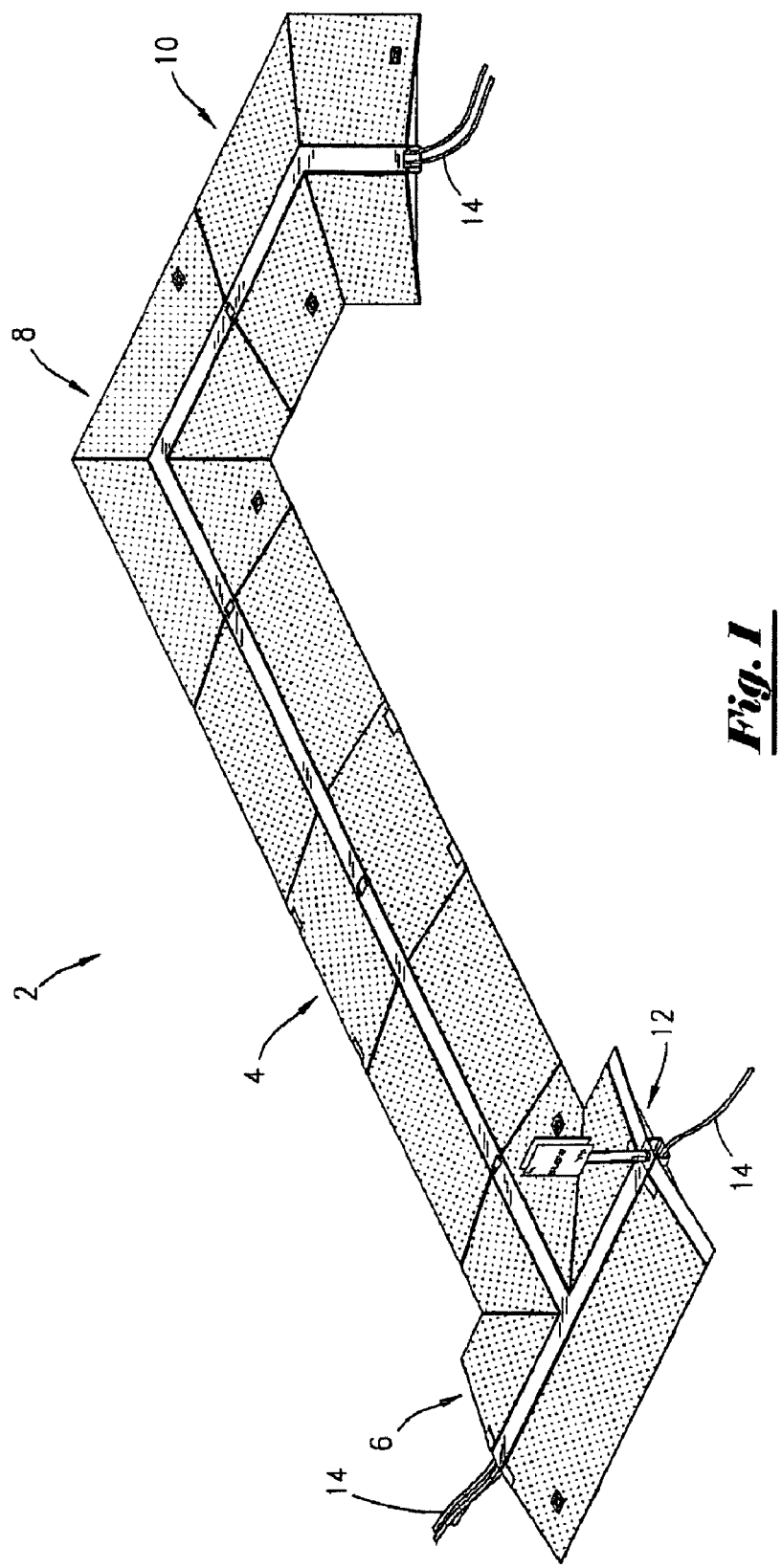
FIG. 1 is a perspective view of the cable protector apparatus and system of the present invention.
Figure 2:
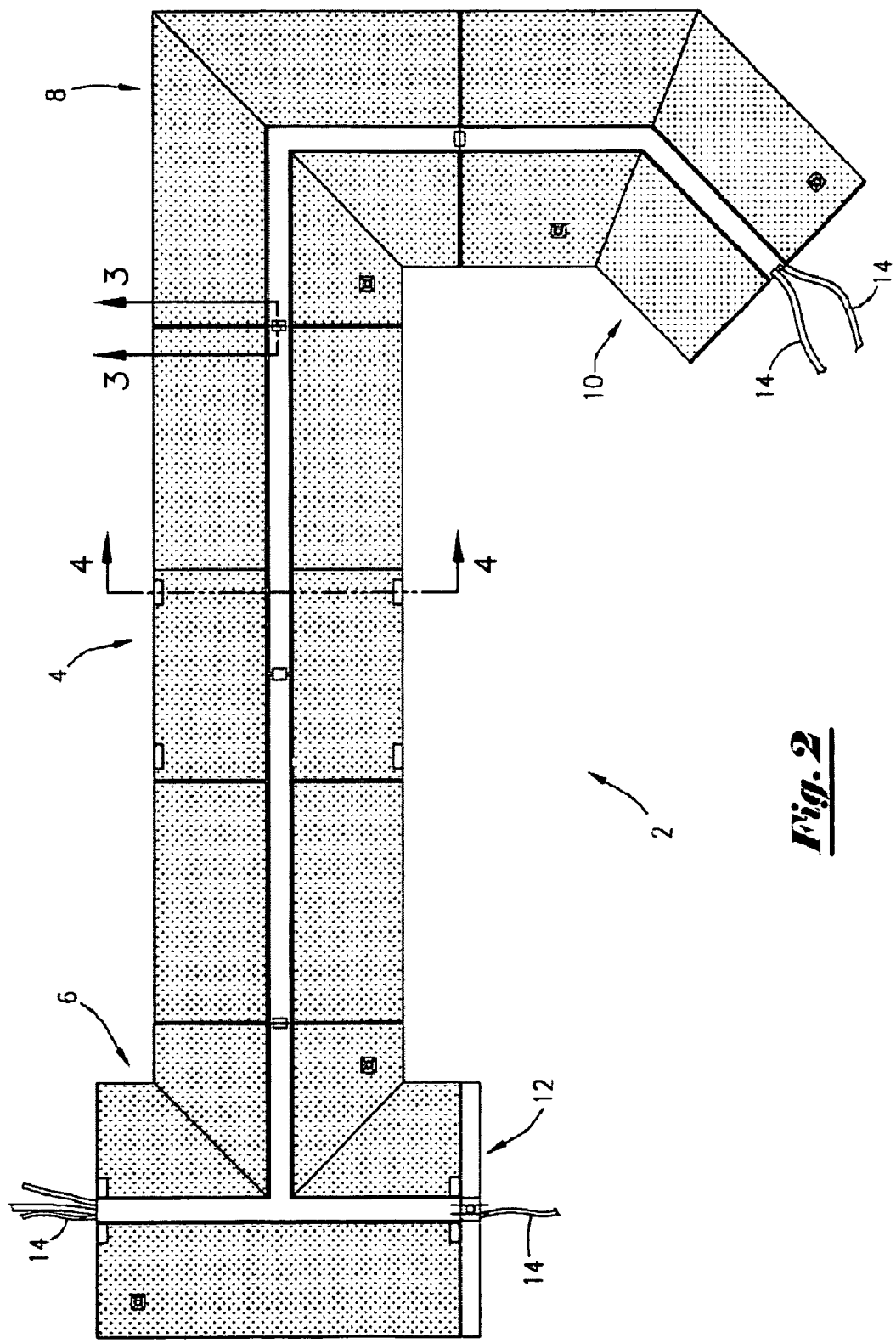
FIG. 2 is top view of the cable protector apparatus and system of FIG. 1

One embodiment of the portable cable protector apparatus and system (2) is shown in a perspective view in FIG. 1 and in a top view in FIG. 2. The apparatus and system (2) is comprised of a plurality of variously configured cable protector sections (6, 4, 8, 10), each such protector section having a protected raceway (24) for placement and protection of a plurality of service lines (14) such as hoses, piping, electrical or communication cables or the like. Each such protector section (6, 4, 8, 10) is also provided with front and rear ramps to provide vehicular access across the protected raceway.

As shown in FIGS. 1 and 2, the cable protector apparatus and system (2) may be comprised of at least one straight or linearly disposed section (4), a T-section (6), a ninety degree turn section (8) and a forty-five degree section (10). Other component sections might be configured as desired such as a section configured for a twenty-two degree turn. A signpost fixture section (12) may also be provided to indicate directions to vehicle drivers or other.

Any one or more of these protector sections (6, 4, 8, 10, and 12) may be configured together as desired to protect or direct service lines (14) to a desired location. The variously configured cable protector sections (6, 4, 8, and 10) may have fixed front and rear ramp covers (16), pivotally mounted front ramp covers (18a) and pivotally mounted rear ramp covers (18b) or a combination of fixed ramp covers (16) and pivotally mounted ramp covers (18a, 18b) to allow vehicles to roll up and over the protected raceway (24).

As shown in FIG. 3, the protector sections (6, 4, 8, 10, 12) may be joined together by section locks (34). One embodiment of a section lock (34) is comprised of a plurality of bolts (42) that span between two adjoining protector sections, shown as sections (2) and (8). Each bolt (42) may be mounted and secured by a lock nut (44) on hollow lock pipes (40) attached in the raceway of adjoining sections to join and hold protector sections together.

As shown in the cross-sectional views, FIGS. 4, 5 and 12, each protected raceway (24) is configured as an elongated box or trough having sidewall members (28), bottom surface member (30). Sidewall members (28) are shown as conventional structural channel-shaped members having an attached bottom section member (30) thought other types of structural members such as angle-shaped members could be utilized. The pivotally mounted front ramp covers (18a) and the rear ramp covers (18b) are connected to the top edge of the raceway (24) by means of hinges (48). The hinged connection of the ramp covers (18a, 18b) to the raceway (24) allows the ramp covers (18a, 18b) to be pivoted on the hinges (48).

Figure 8:
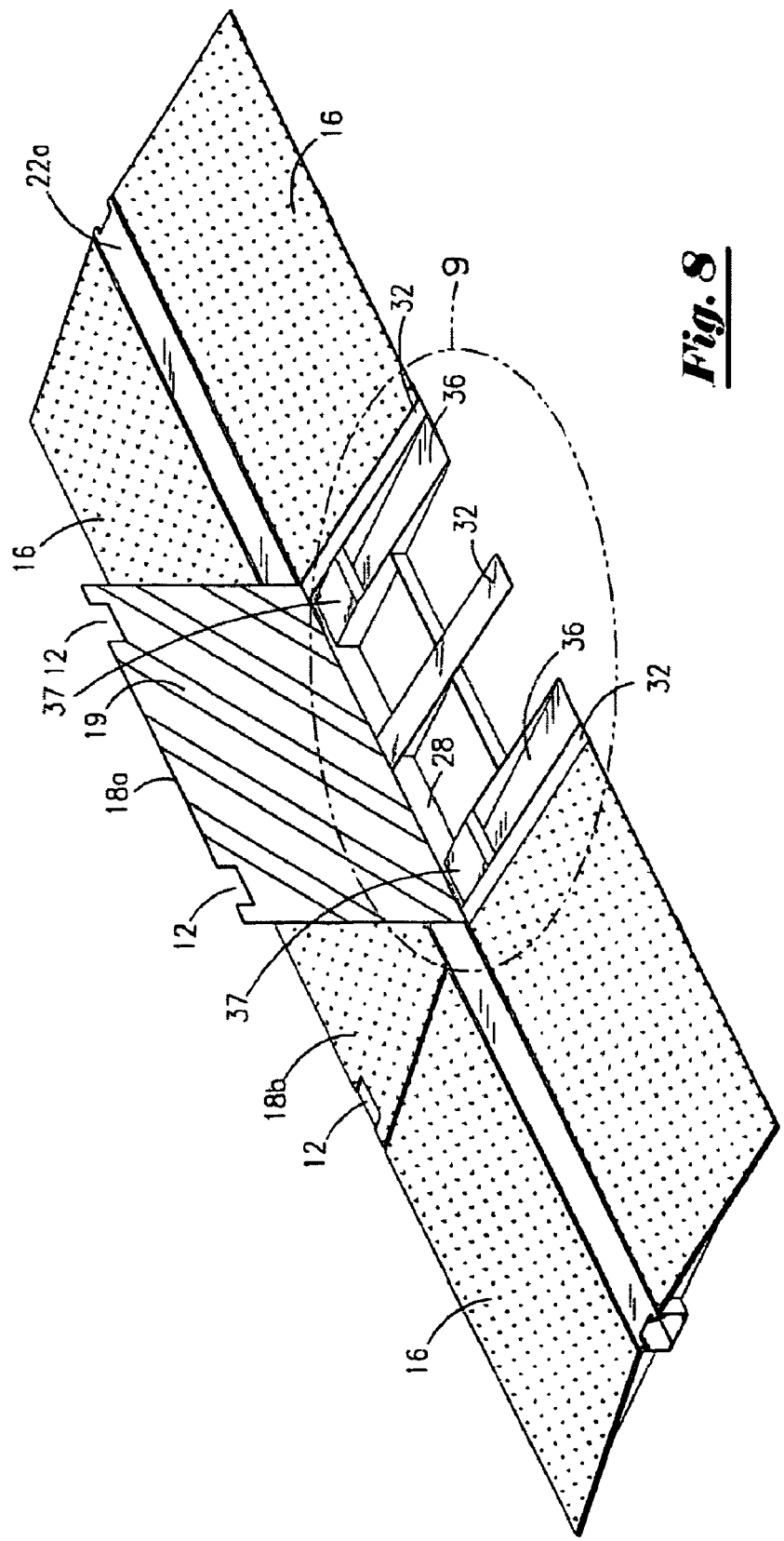
FIG. 8 is a perspective view of the ramp system shown in FIG. 6 with the ramp in a barrier position.
Figure 9:
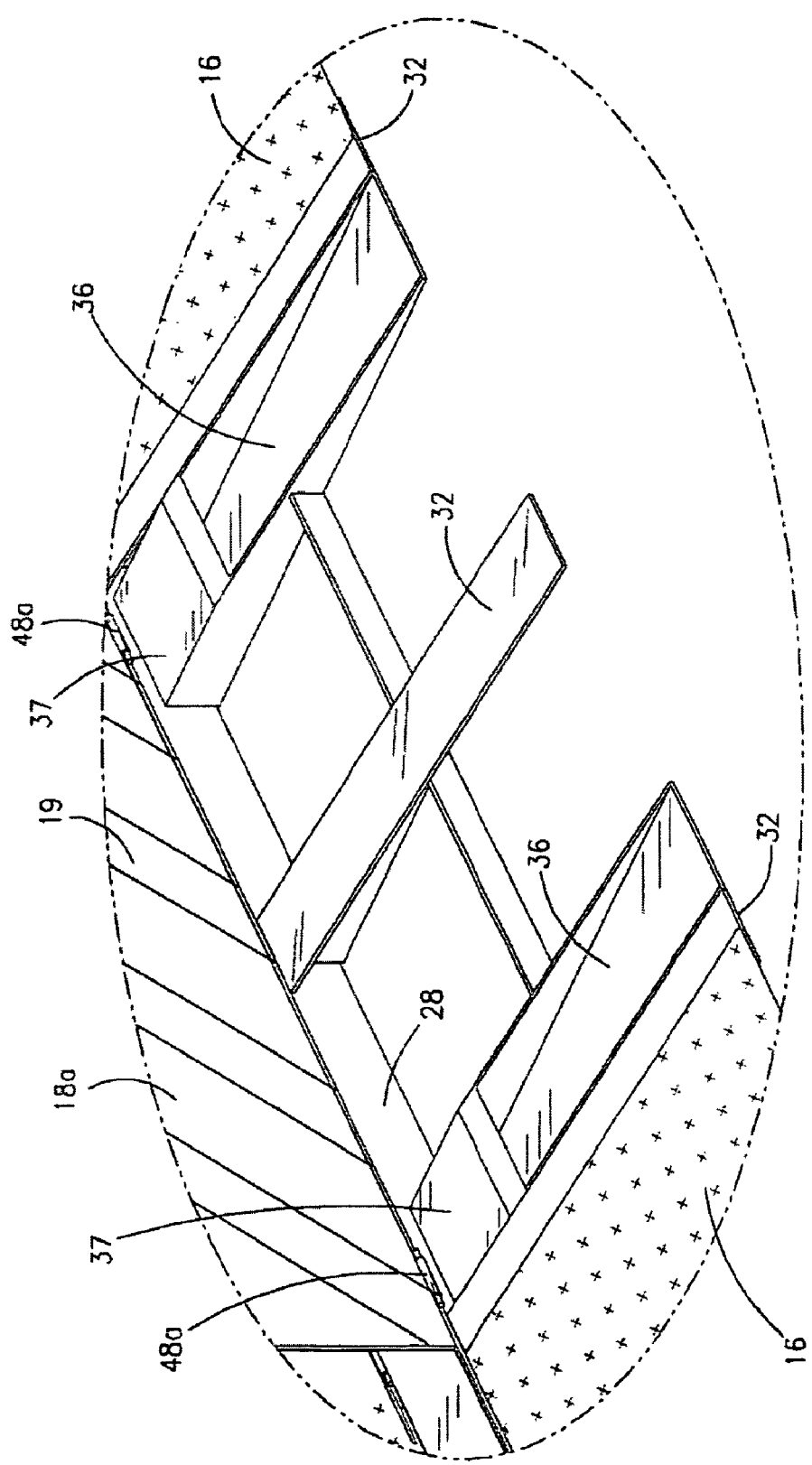
FIG. 9 is a perspective view of the forklift slots of the cable protector apparatus and system of FIG. 1.

As shown in FIG. 6 and FIG. 8, top perspective views of a linear protector section (4) of the cable protector apparatus and system (2), the ramp covers (18a and 18b) may be provided with forklift tine access slots (20). The pivotal movement of the ramp covers (18a, 18b) on the hinges (48) and the tine access slots (20) provide an opening for the insertion of forklift tines to allow positioning on such tines within lifting channels (36) that are constructed as part of the ramp support frame of the protector section. The lifting channels (36) have a tine lift plate (37) which allows the protector sections (4) to be supported on the tines of a forklift.

Figure 7:
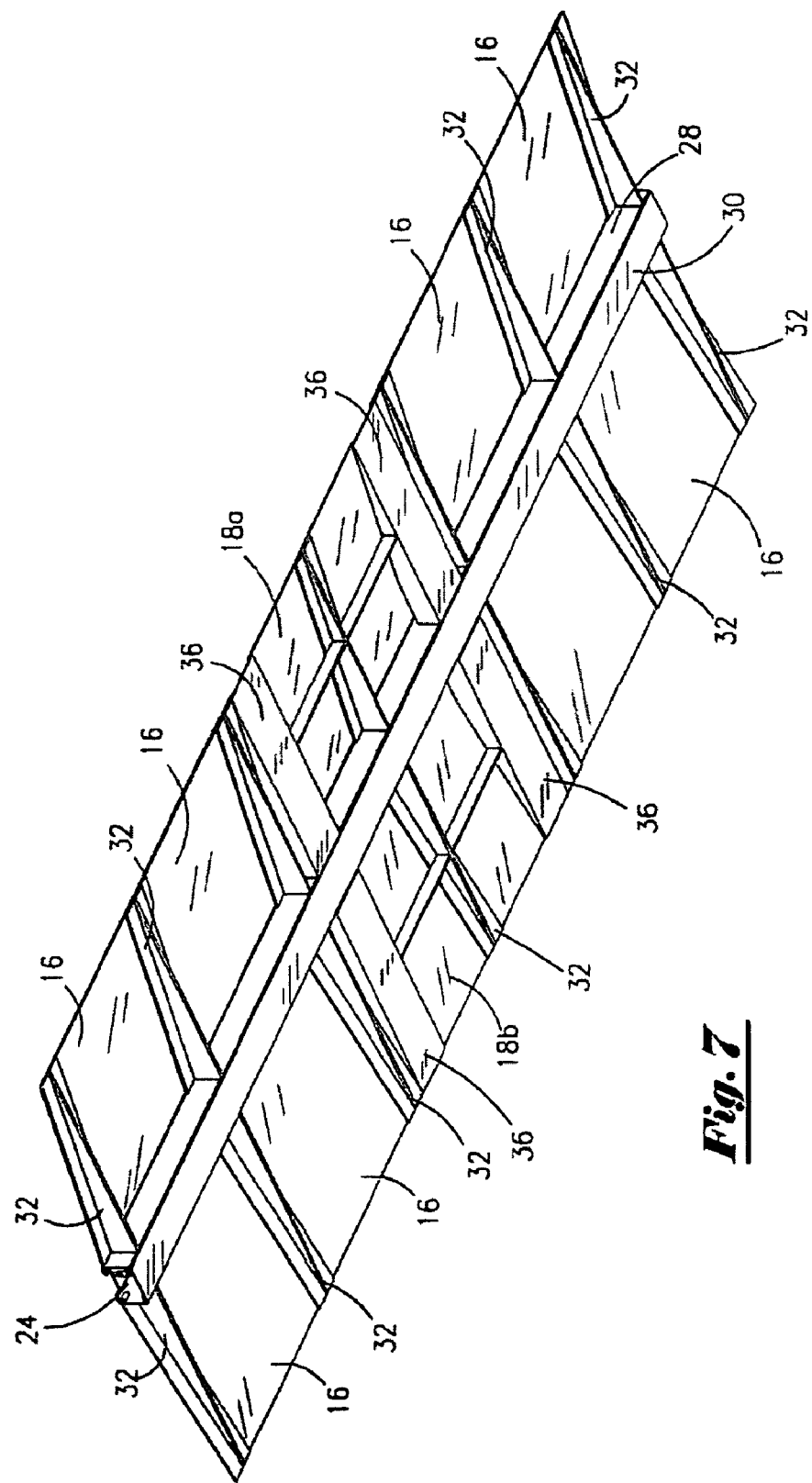
FIG. 7 is a bottom perspective view of FIG. 6.

As can be seen in FIG. 7, a bottom perspective view of the of the linear section (4) as shown in FIGS. 6 and 8, the linear sections (4) are comprised of a frame consisting of the protected raceway (24) to which sloping ramp supports (32) are attached. These ramp supports (32) support the fixed ramp covers (16) and the pivoting ramp covers (18a and 18b). The lifting channels (36) also serve to support ramp covers (18a and 18b).

Figure 10:
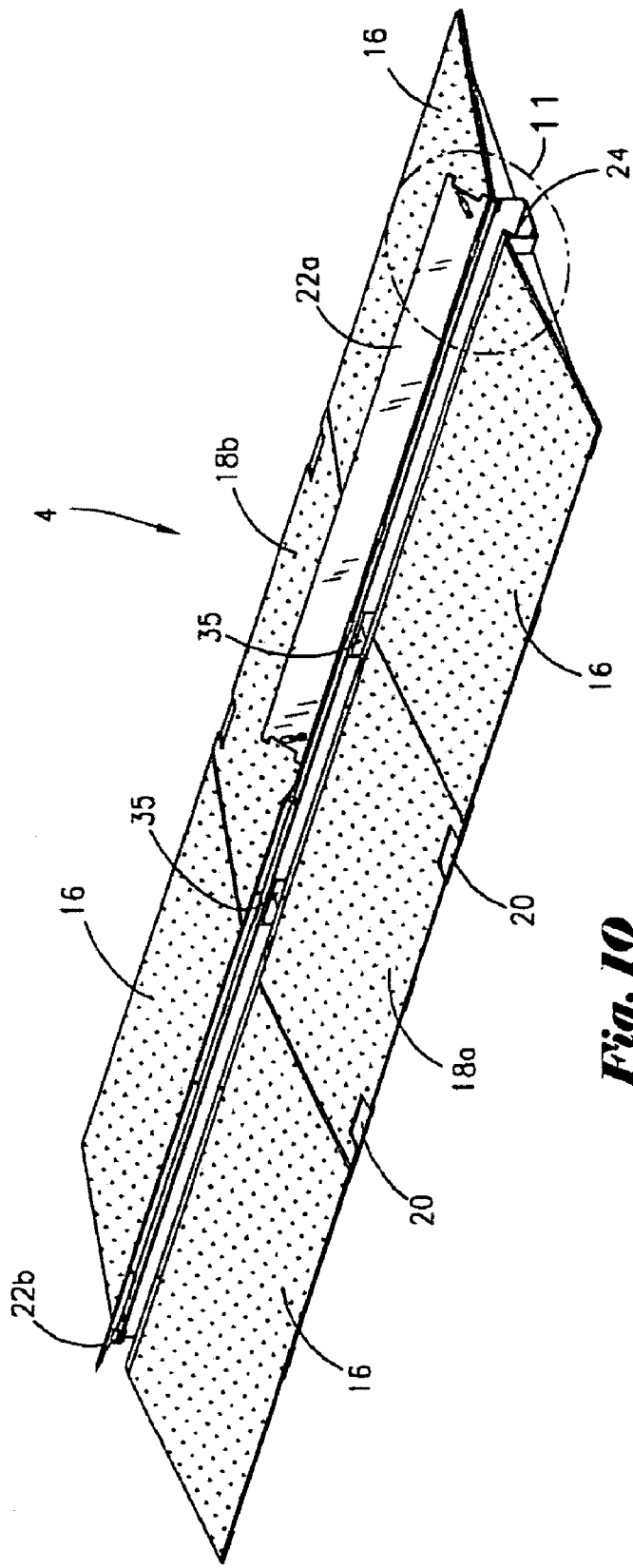
FIG. 10 is a top perspective view showing the covers of the service line raceway of the cable protector apparatus and system of FIG. 1.

As shown in FIG. 10, the protected raceway (24) of each the linear section (4) has pivotally connected raceway covers (22a, 22b) to allow placement of and access to the service lines (14). In the embodiment shown in FIG. 11 and FIG. 12, the raceway covers (22a and/or 22b) are pivotally mounted on hinges (23) on the top flange (29) of the raceway sidewall (28). A handhold cutout (26) may be placed in the covers (22a, 22b) to assist in raising and lowering the raceway covers.

As shown more clearly in FIG. 11 and 12, the raceway (24) may be provided with at least one raceway cover lock (46) to hold the raceway covers (22a and 22b) in place at the top flange (29) of the raceway sidewall (28). One embodiment of a raceway cover lock (46) is comprised of a bolt (45) slidably mounted on a hollow pipe (49). Lock nuts (47) hold the bolt (45) in position on the lock pipe (49). The raceway covers (22a, 22b) also may be provided with a plurality of lock pins (52) that protrude from the underside of the raceway covers (22a, 22b) to match with a plurality of lock pin holes (54) in the top flange (29) of the raceway sidewall (28).

Each of the cable protector sections (6, 4, 8, 10), including the frame members (32), the ramp covers (16, 18a, 18b), the raceway (24) and the raceway covers (22a, 22b) are configured to support the weight of heavy construction equipment and vehicles. The cover lock (46) and the lock pins (52) and pin holes (54) help to secure the raceway covers (22a, 22b) in place under heavy traffic loads.

Figure 15:
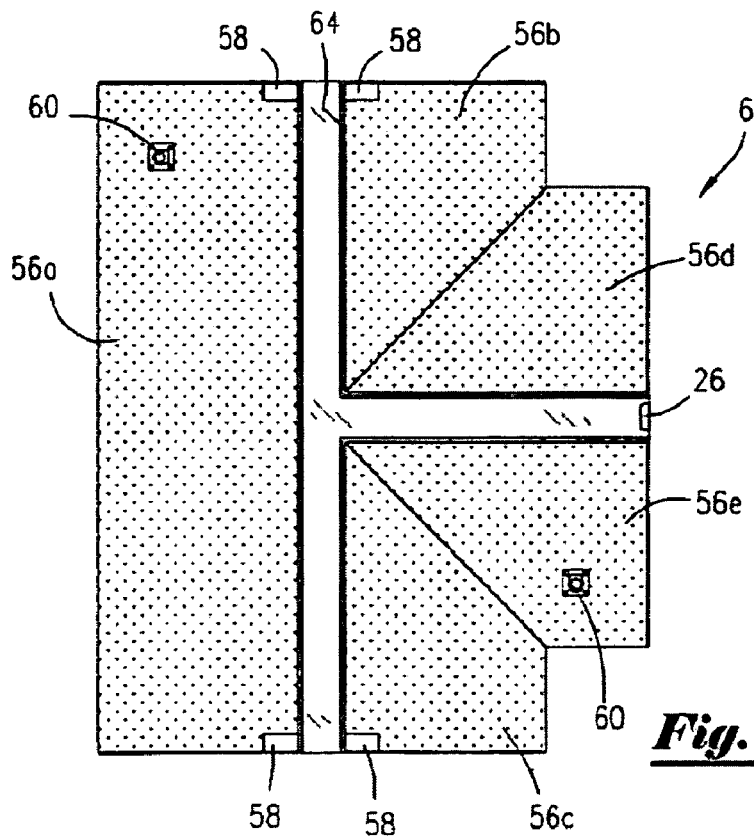
FIG. 15 is a top view of the T-intersection component of the cable protector apparatus and system shown in FIG. 13.
Figure 16:
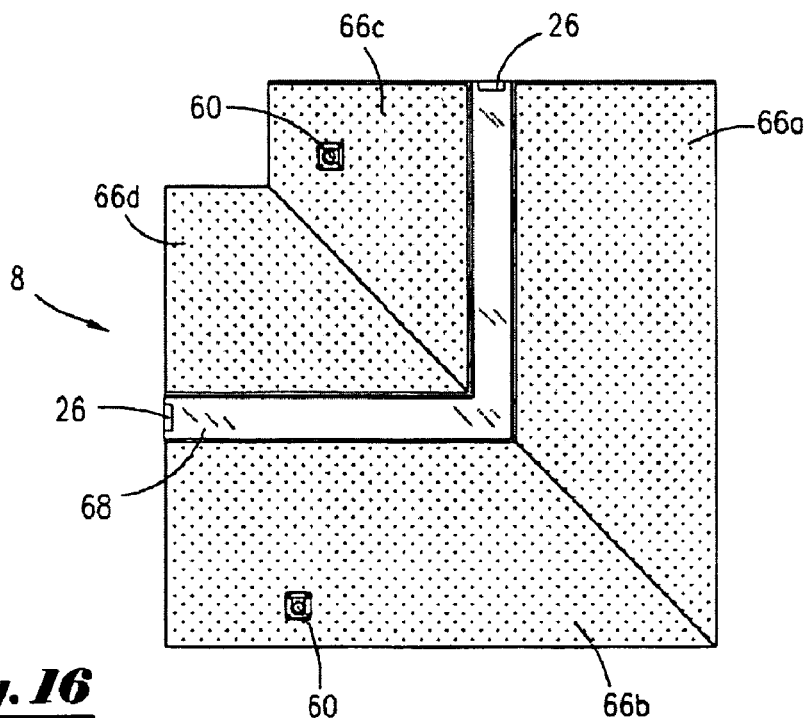
FIG. 16 is a top view of a 90° turn component of the cable protector apparatus and system of FIG. 1.

An embodiment of the cable protector T-section (6) is shown in detail in FIGS. 13, 14 and 15. The T-section (6) is comprised of ramps (56a, 56b, 56c), cable raceways (24), and a T-shaped raceway cover (64). As with linear section (4) the raceway cover (64) of the T-section (6) is pivotally attached to the top of the cable raceway by hinges (23). A handhold cutout (26) in the cover (64) may also be provided to assist in raising and lowering the raceway cover (64). Hollow lock pipes (40) to mate with lock bolts (42) may be provided to join a T-section (6) with other sections of the cable protector system. The raceway cover (64) may also be provided with a cover lock (46) as described above as well as a plurality of lock pins (52) to match with a plurality of lock pin holes (54) in the top of the sidewall of the raceway (24). Lifting lugs or rings (6o) may be provided to allow attachment of a hoist or sling to aid in moving or assembling the cable protector ramps. Reflector plates (58) may be added to the ramps as a safety marker.

Figure 17:
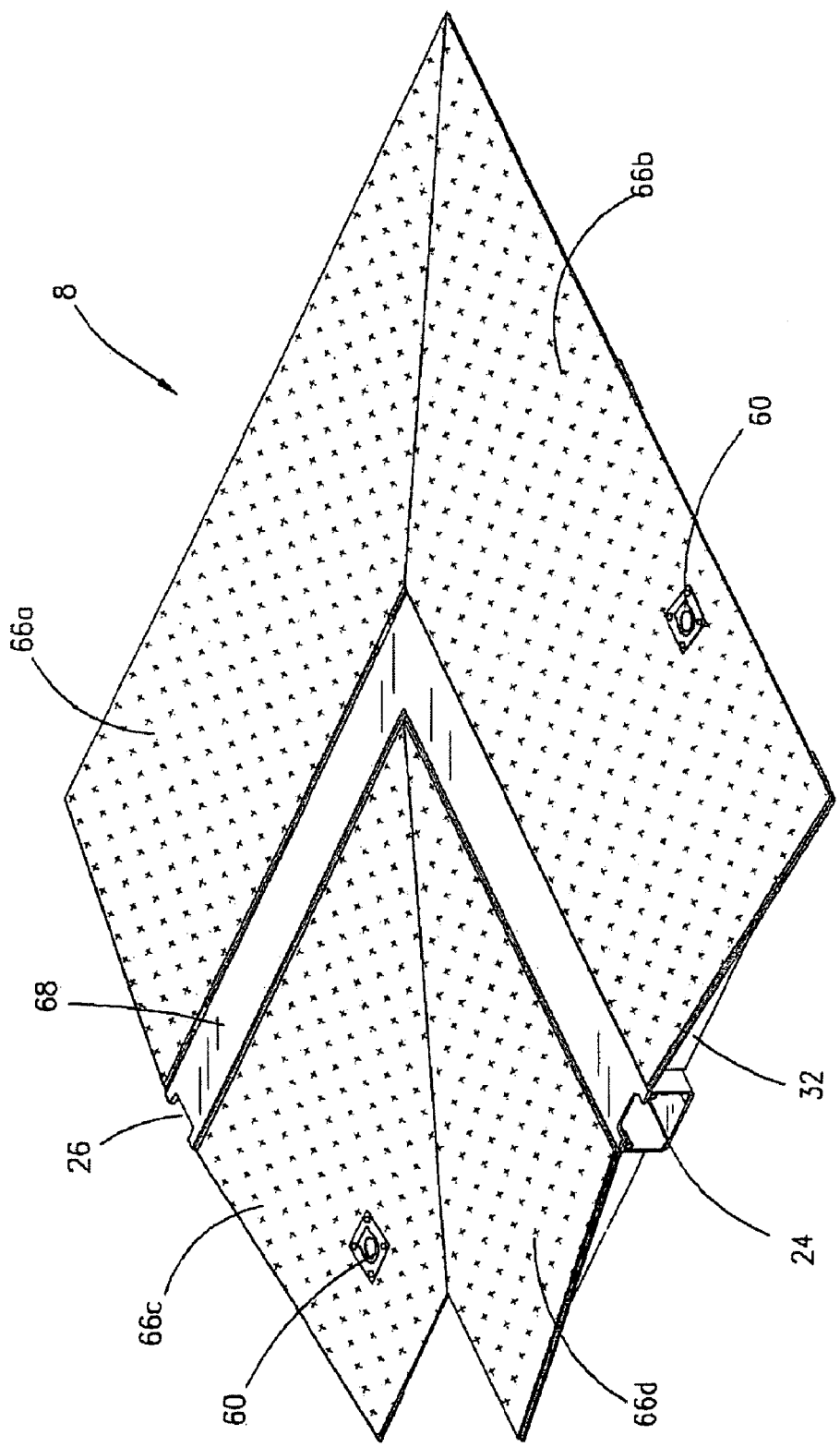
FIG. 17 is a perspective view of the 90° turn component of FIG. 6.
Figure 18:
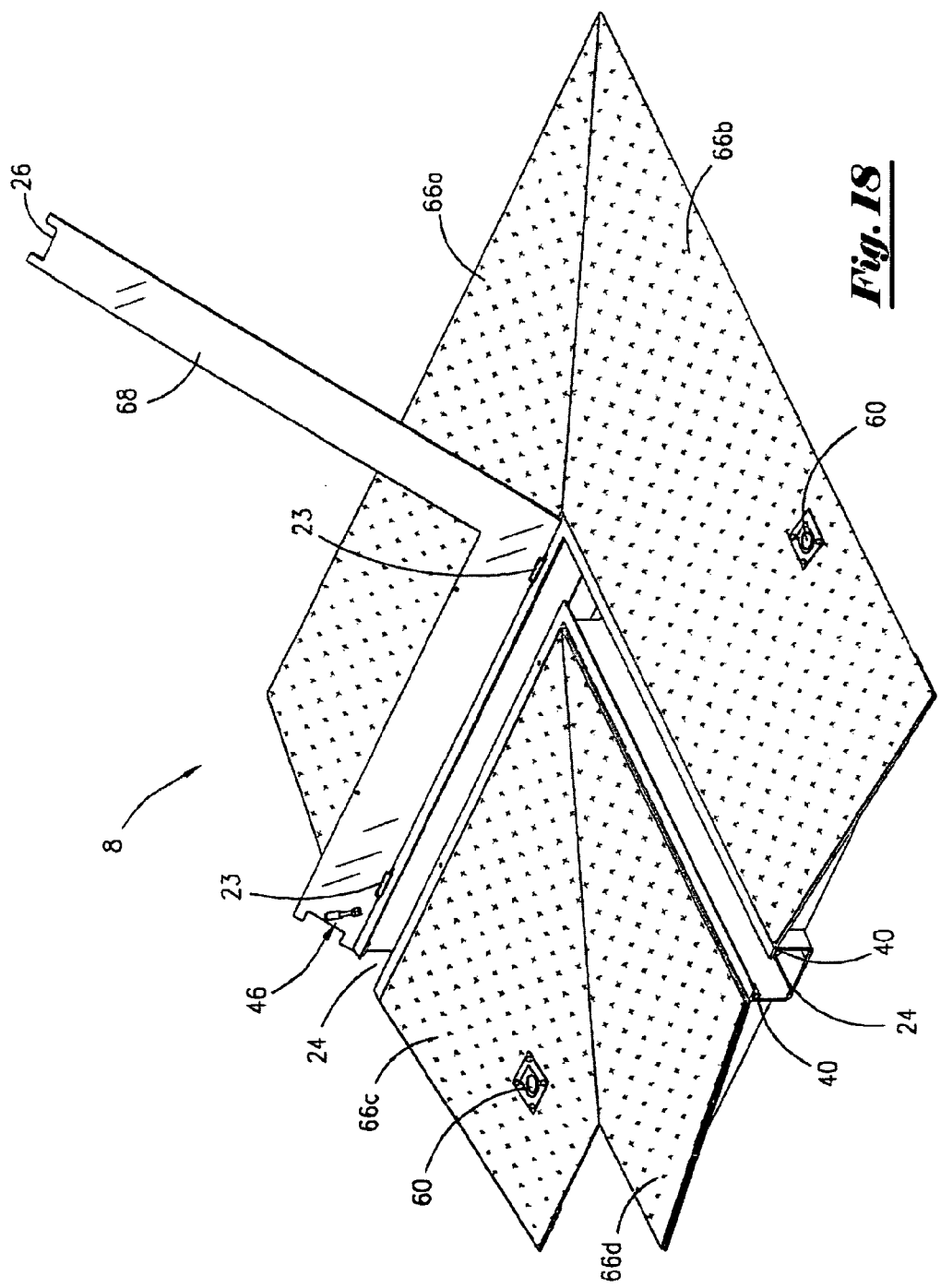
FIG. 18 is a perspective view of the 90° turn component of FIG. 17 showing the raceway cover in an open position.

FIGS. 17 and 18 show an embodiment of a ninety degree turn protector section (8) of the portable cable protector apparatus and system (2). The ninety degree turn section (8) is comprised of ramps (66a, 66b, 66c), cable raceways (24), and a ninety degree L-shaped raceway cover (68). As with the other system sections (4 and 6) the raceway cover (68) of the ninety degree protector section (8) is pivotally attached to the top of the cable raceway by hinges (23). A handhold cutout (26) in the cover (68) may also be provided to assist in raising and lowering the raceway cover (68). Hollow lock pipes (40) to mate with lock bolts (42) may be provided to join a protector section (8) with other sections of the cable protector system. The raceway cover (68) may also be provided with a cover lock (46) as described above and with a plurality of lock pins (52) to match with a plurality of lock pin holes (54) in the top of the sidewall of the raceway (24). Lifting lugs or rings

(60) may be provided to allow attachment of a hoist or sling to aid in moving or assembling the cable protector sections.

Figure 19:
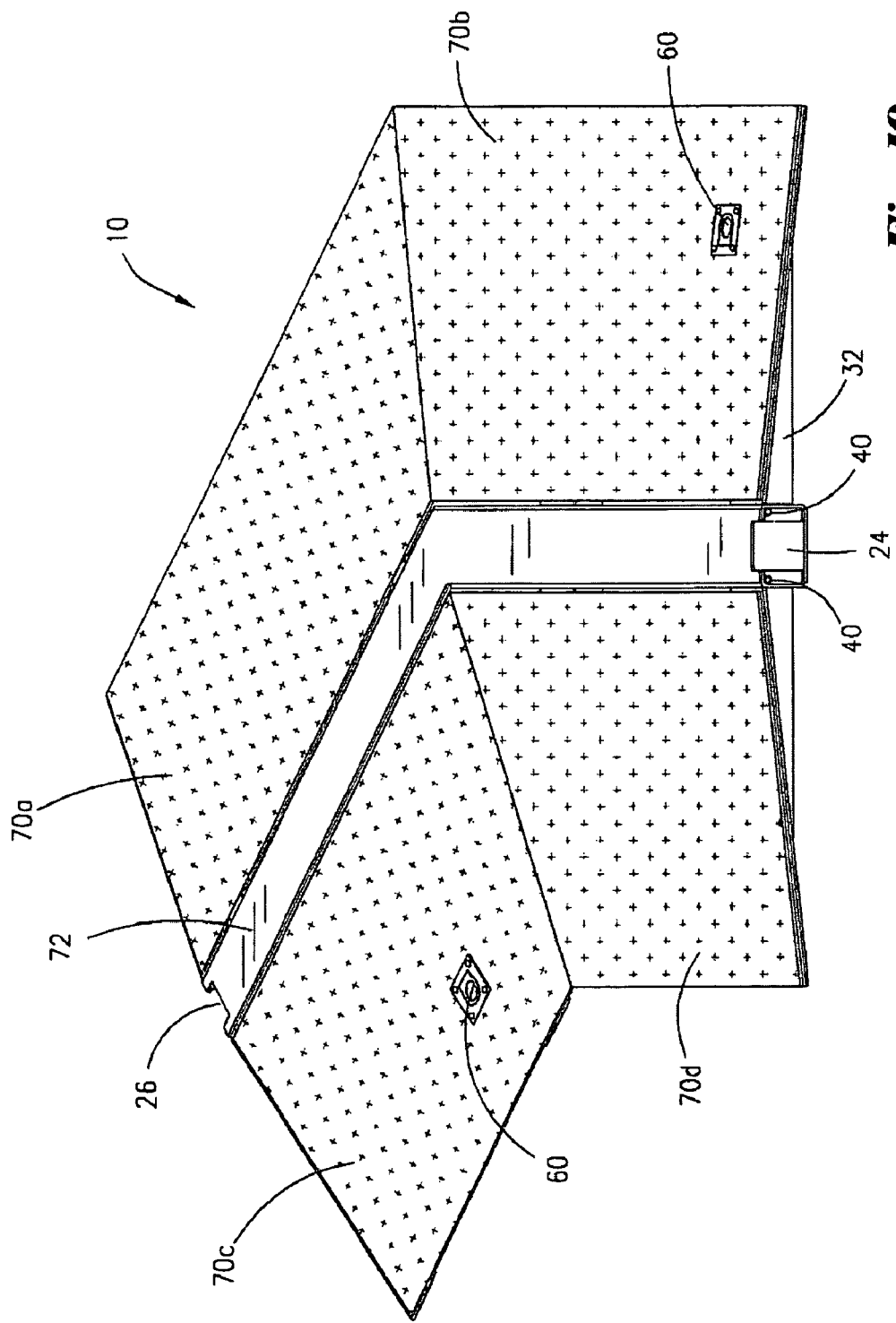
FIG. 19 is a perspective view of a 45° turn component of the cable protector apparatus and system of FIG. 1.
Figure 20:
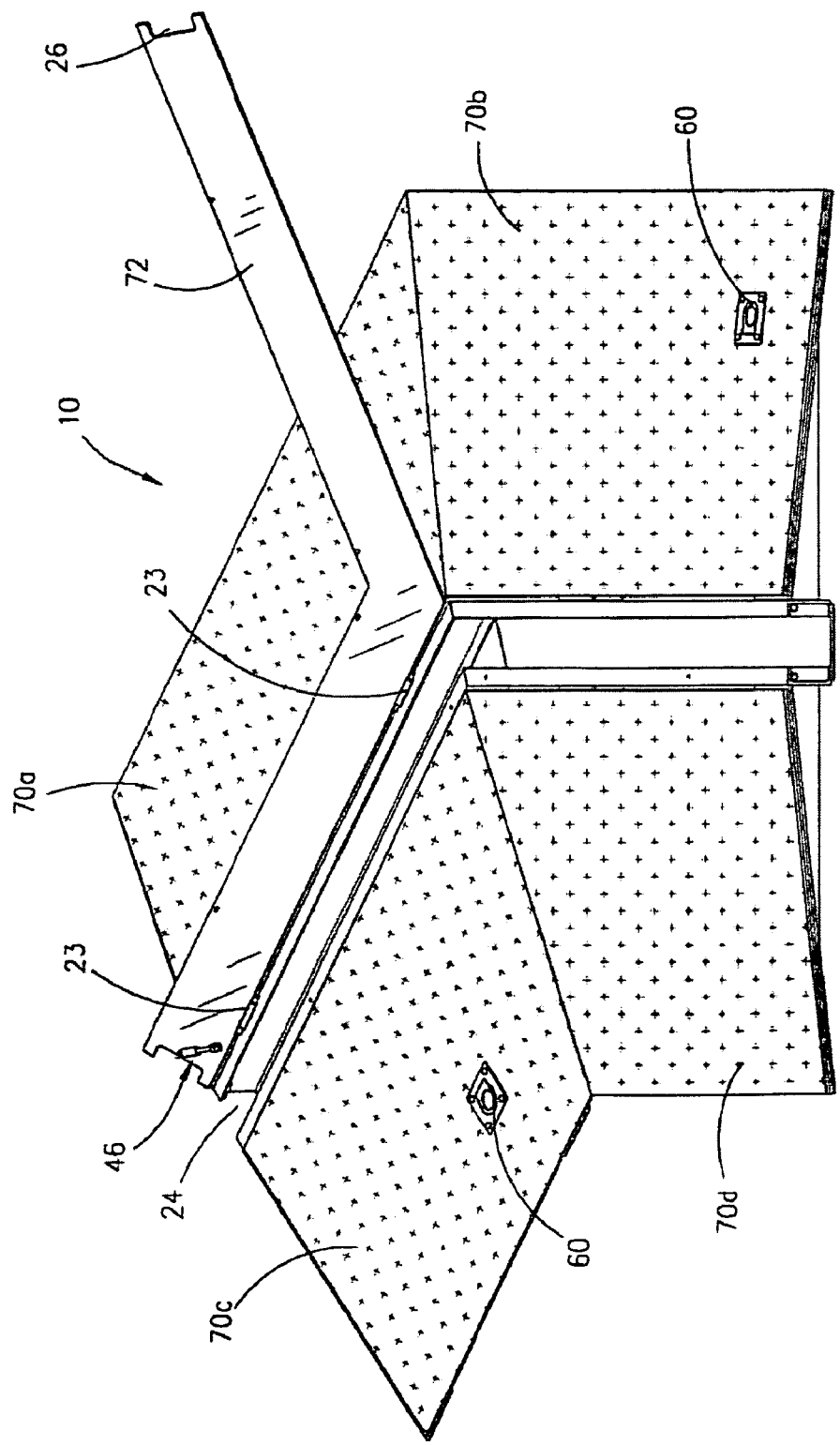
FIG. 20 is a perspective view of a 45° turn component of FIG. 19 showing the raceway cover in an open position.
Figure 21:
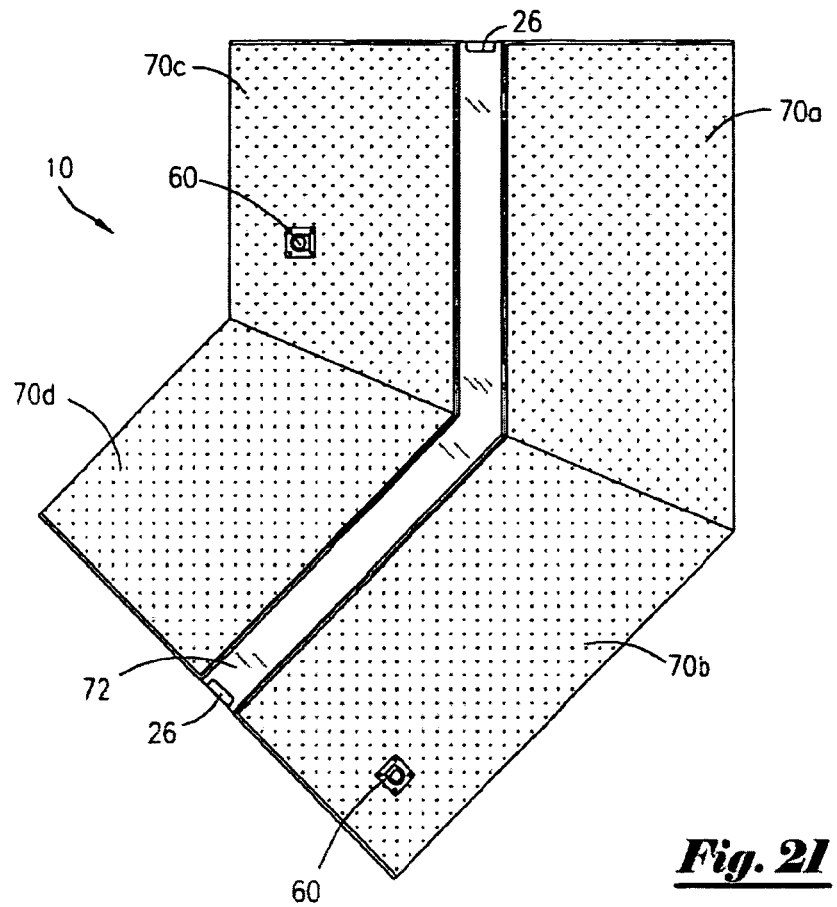
FIG. 21 is a top view of the component of FIG. 19.

FIGS. 19, 20 and 21 show an embodiment of a forty-five degree turn protector section (10) of the portable cable protector apparatus and system (2). The forty-five degree turn section (10) is comprised of ramps (70a, 70b, 70c), cable raceways (24), and a forty-five degree angled raceway cover (72). As with the other system protector sections (4, 6 and 8) the raceway cover (72) of the forty-five degree angled section (10) is pivotally attached to the top of the cable raceway by hinges (23). A handhold cutout (26) in the cover (72) may also be provided to assist in raising and lowering the raceway cover (72). Hollow lock pipes (40) to mate with lock bolts (42) may be provided to join an angled section (10) with other sections of the cable protector system (2). The raceway cover (72) may also be provided with a cover lock (46) as described above and with a plurality of lock pins (52) to match with a plurality of lock pin holes (54) in the top of the sidewall of the raceway (24). Lifting lugs or rings (60) may be provided to allow attachment of a hoist or sling to aid in moving or assembling the cable protector ramps.

Figure 22:
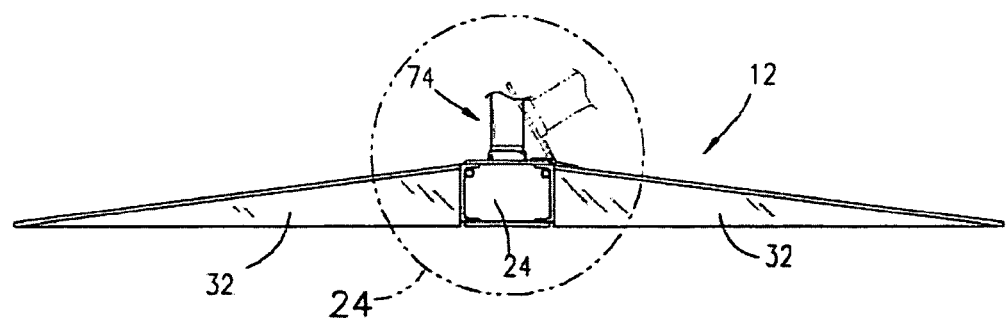
FIG. 22 is a cross-section view of the sign socket component of the cable protector apparatus and system of FIG. 1.
Figure 23:
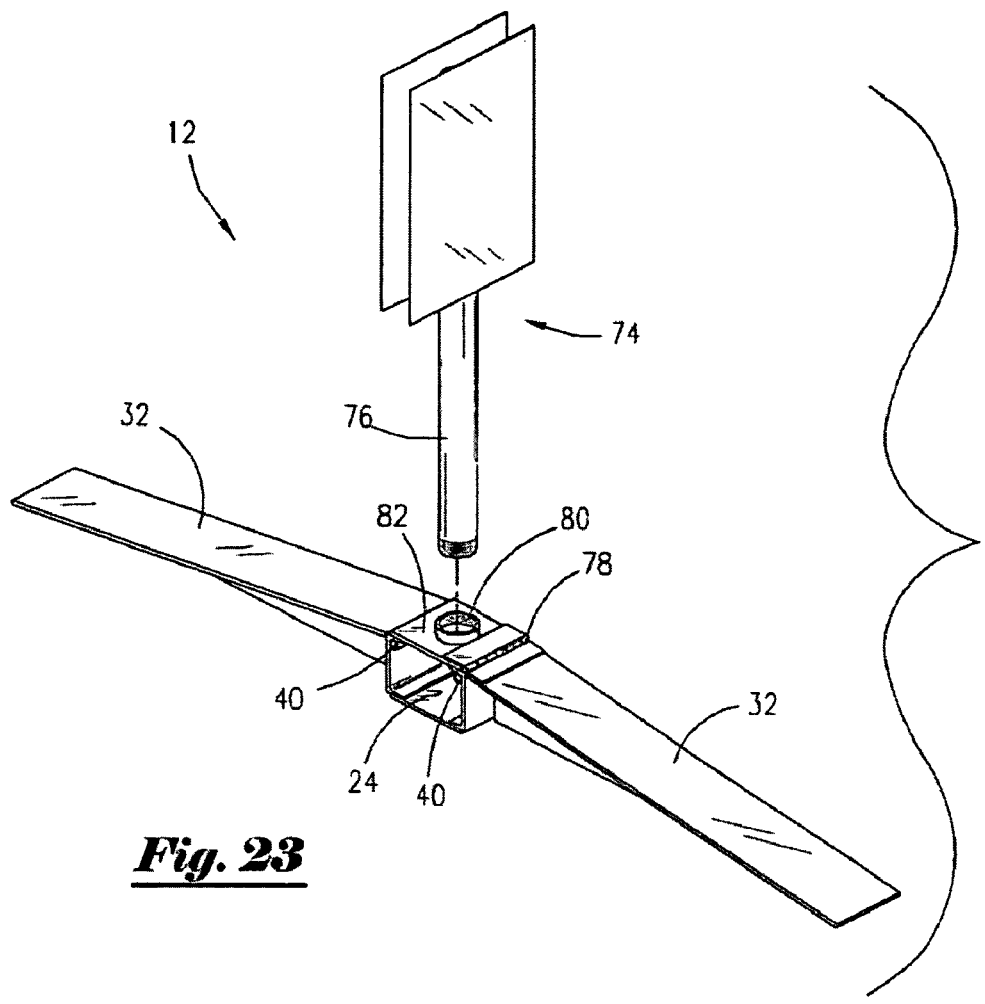
FIG. 23 is an exploded view of the sign socket component of FIG. 22.
Figure 24:
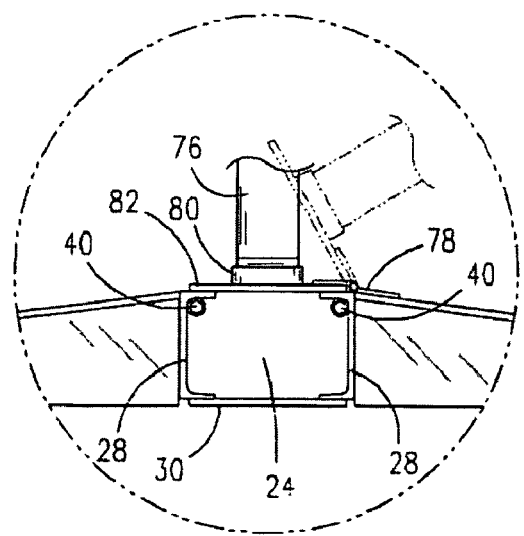
FIG. 24 is enlarged partial cross-section view of the sign socket component of FIG. 23.

FIGS. 21, 22 and 23 show a detachable signpost fixture (12) that may be utilized with the portable cable protector apparatus and system (2) to detachably mount a signpost (74). The signpost fixture (12) is comprised of a short cable raceway (24) and front and back ramp supports (32). The raceway (24) of the signpost fixture (12) has a cover plate (82) pivotally attached at the top of the raceway sidewall (28) by a hinge (78). A threaded pipe (80) is provided to receive threaded post (76) of the signpost (74). Hollow lock pipes (40) to mate with lock bolts (42) may be provided to join, as may be desired, a signpost fixture (12) to other protector sections (4, 6, 8, 10) of the cable protector system (2).

Each of the sections (6, 8, and 10) of the cable protector apparatus and system (2) may also be provided with pivotally mounted ramp covers (18a, 18b) having forklift tine access slots (2o) such as those described above for the ramp covers of protector section (4). Each of the sections (6, 8, and 10) of the cable protector apparatus may also be provided with lifting channels (36) with tine lift plates (37) to correspond with the slots in the pivotally mounted ramp covers. These features will allow each of the sections (6, 8, 10) to be lifted and supported on forklift tines for movement and placement of these protector sections. Similarly, each linear protector section (4) might also be provided with lifting rings (60) to accommodate the attachment of a lifting sling to assist in moving and assembling a linear section (4) into the cable protector system (2).

The pivoting ramp covers or a single ramp cover of a protector section such as ramp covers (18a, 18b) of linear section (4), as shown in FIG. 8, may be pivoted on hinges (48a, 48b) and raised to a substantially vertical position. Doing so will provide, if desired, a barrier to restrict or preclude vehicle access across the protected service line raceway. Similarly, the ramp covers (18a, 18b) of linear section (4), as shown in FIG. 8, may be pivoted on hinges (48a, 48b) and lowered to allow access over the raceway (24). This will allows the ramp sections to be used as a security or traffic control apparatus as well as a cable protector.

A cross-section view of an alternate embodiment of the cable protector apparatus is shown in FIG. 25. By way of example, a linear section (4) may be modified to provide a frame consisting of the protected raceway (24) to which sloping ramp supports (32) are pivotally attached by a hinge connection (33). It is thought that pivotally attaching the ramp support (32) to the raceway (24) will allow a cable protection section to be more effectively used in areas where the ground surface is uneven. While the angle of pivot of the ramp support (32) with respect to the raceway (24) may be varied as desired, it is thought that allowing the end of the ramp support (32) to pivot on the hinge (33) about three inches vertically up or down with respect to the bottom (30) of the raceway (24) would be sufficient to accommodate uneven ground situations.

It is thought that the cable protector apparatus and system and the method of the present invention and many of its attendant advantages will be understood from the foregoing description. It is also thought that one may make various changes in the form, construction and arrangement of the parts of the cable protector apparatus and system without sacrificing its material advantages or departing from the spirit and scope of the invention and that the form described herein is merely an exemplary embodiment of the invention.

I claim:

1. A portable service line protector apparatus and system comprising:

(a) a plurality of variously configured protector sections, each said protector section having an elongated cable raceway frame, said elongated frame raceway frame being configured to provide a centrally oriented longitudinally extending raceway, said raceway frame having a top and a bottom and first and second vertically extending sidewalls, said first and second sidewalls extending vertically upward from the bottom of said raceway to the top of said raceway, (b) a first inclined vehicle ramp support positioned transverse to said elongated raceway frame, said first inclined vehicle ramp support having a first edge and a second edge, said first vehicle ramp support inclined upward from said first edge of said first vehicle ramp support to said second edge of said first vehicle ramp support, said second edge of said first vehicle ramp support being positioned at said top of said elongated raceway frame along said first sidewall of said raceway frame of each said protector section, (c) a second inclined vehicle ramp support positioned transverse to said elongated raceway frame, said second inclined vehicle ramp support having a first edge and a second edge, said second inclined vehicle ramp support inclined downward from said first edge of said second vehicle ramp support to said second edge of said second vehicle ramp support, said first edge of said second vehicle ramp support being positioned at said top of said elongated raceway frame along said second sidewall of said raceway of each said protector section;

(d) a first inclined vehicle ramp cover extending along said elongated raceway frame over said first vehicle ramp support, said first vehicle ramp cover having a first edge corresponding to said first edge of said first vehicle ramp support and a second edge corresponding to said second edge of said first vehicle ramp support of each said protector section;

(e) a raceway cover extending over said top of said raceway of said elongated raceway frame from said first sidewall of said raceway frame to said second sidewall of said raceway frame of each said protector section;

(f) a second inclined vehicle ramp cover extending along said elongated raceway frame over said second vehicle ramp support, said second vehicle ramp cover having a first edge corresponding to said first edge of said second vehicle ramp support and a second edge corresponding to said second edge of said second vehicle ramp support of each said protector section;

(d) a hinge along said top of at least one of said raceway sidewalls of said elongated raceway frame whereby at least one of said first and second vehicle ramp covers of each said protector section is pivotally mounted on said hinge so as provide said pivotally mounted vehicle ramp cover with a hinged edge and a non-hinged edge;

(e) a lifting channel within at least one of said first and second inclined vehicle ramp supports of each said protector section, said lifting channel being positioned transverse to said elongated raceway frame and below said pivotally mounted vehicle ramp cover; and (f) each said pivotally mounted vehicle ramp cover having a slot at its non-hinged edge corresponding to each said lifting channel.

2. The apparatus and system of claim 1 wherein said raceway cover is pivotally mounted to said elongated raceway frame.

3. The apparatus and system of claim 1 wherein said plurality of variously configured protector sections are connected together in a desired configuration.

4. The apparatus and system of claim 3, whereby said plurality of variously configured protector sections are connected together by section locks, said section locks comprised of a plurality of bolts that span between two adjoining protector sections, each said bolt positioned within hollow lock pipes attached in said raceways of adjoining protector sections.

5. The apparatus and system of claim 3 wherein said plurality of variously configured protector sections are selected from a group consisting of linear protector sections, ninety degree turn protector sections, forty-five degree turn protector sections, twenty-two and one-half degree turn protector sections or T-intersection cable protector sections.

6. The apparatus and system of claim 5 wherein each said protector section of said plurality of variously configured protector sections is provided with at least one lifting lug.

7. The apparatus and system of claim 6 wherein each said protector section has at least two said lifting channels and wherein each said pivotally mounted vehicle ramp cover of each said protector section has at least two slots its said non-hinged edge, each of said slots corresponding with one of said lifting channels.

8. The apparatus and system of claim 5 wherein each said pivotally mounted vehicle ramp cover of each said protector section may be raised to a substantially vertical position.

9. The apparatus in claim 3 wherein said first and said second inclined vehicle ramp supports of each said protector section are pivotally mounted to said raceway frame.

10. A portable cable and piping protector apparatus comprising:

(a) an elongated frame, said elongated frame being configured to provide a centrally oriented longitudinally extending raceway, said raceway having a top and a bottom and first and second vertically extending sidewalls, said first and second sidewalls extending vertically upward from the bottom of said raceway to the top of said raceway;

(b) a first inclined vehicle ramp extending along said frame and transverse to said raceway, said first inclined vehicle ramp having a cover and a first edge and a second edge, said first inclined vehicle ramp inclined upward from said first edge of said first inclined vehicle ramp to said second edge of said first inclined vehicle ramp, said second edge of said first inclined vehicle ramp being positioned at said top of said raceway along said first sidewall of said raceway;

(c) a raceway cover extending over said top of said raceway from said first sidewall to said second sidewall of said raceway;

(d) a second inclined vehicle ramp extending along said frame and transverse to said raceway, said second inclined vehicle ramp having a cover and a first edge and a second edge, said second inclined vehicle ramp inclined downward from said first edge of said second inclined vehicle ramp to said second edge of said second inclined vehicle ramp, said first edge of said second inclined vehicle ramp being positioned at said top of said raceway along said second sidewall of said raceway;

(e) a hinge along said top of said raceway sidewall whereby at least one of said covers of said first and second vehicle ramps is pivotally mounted on said hinge so as provide said pivotally mounted vehicle ramp cover with a hinged edge and a non-hinged edge;

(f) at least two lifting channels within said frame, each said lifting channel being positioned transverse to said raceway and below said pivotally mounted vehicle ramp cover;

(g) said pivotally mounted vehicle ramp cover having a slot along its non-hinged edge corresponding with each said lifting channel.

11. The apparatus of claim 10 wherein said raceway cover is pivotally mounted to said elongated raceway frame said raceway cover having at least one handhold cutout and a means for locking said raceway cover in place over said raceway.

12. The apparatus of claim 11 further comprising a plurality of lift lugs mounted to said frame.

13. The apparatus of claim 12 wherein said pivotally mounted vehicle ramp cover may be raised to a substantially vertical position.

14. The apparatus of claim 13, further comprising:

(a) a signpost fixture having a signpost raceway with a top, bottom and first and second side walls, first and second ramps mounted transverse to said signpost raceway, a cover plate extending across said top of said signpost raceway, said cover plate pivotally attached at the top of said signpost raceway; and (b) a signpost holder mounted to said fixture for receiving a signpost.

15. The apparatus in claim 10 wherein at least one of said first and said second inclined vehicle ramps are pivotally mounted to said elongated frame.

16. A method for protecting service lines comprising:

(a) providing a plurality of variously configured protector sections, each said protector section having an elongated frame configured to provide a centrally oriented longitudinally extending raceway, each raceway having a top and a bottom and first and second vertically extending sidewalls, a first inclined vehicle ramp extending along said frame, said first inclined vehicle ramp having a cover and a first edge and a second edge, said first inclined vehicle ramp inclined upward from said first edge of said first inclined vehicle ramp to said second edge of said first inclined vehicle ramp, said second edge of said first inclined vehicle ramp being positioned at said top of said raceway along said first sidewall of said raceway, a cover extending across said top of said raceway from said first sidewall to said second sidewall, a second inclined vehicle ramp extending along said frame, said second inclined vehicle ramp having a cover and a first edge and a second edge, said second inclined vehicle ramp inclined downward from said first edge of said second inclined vehicle ramp to said second edge of said second inclined vehicle ramp, said first edge of said second inclined vehicle ramp being positioned at said top of said raceway along said second sidewall of said raceway, a hinge along said top of at least one of said raceway sidewalls whereby at least one of said first and second vehicle ramp covers is pivotally mounted on said hinge so as provide said pivotally mounted vehicle ramp cover with a hinged edge and a non-hinged edge, at least one lifting channel within said frame, said lifting channel being positioned transverse to said raceway and below said pivotally mounted vehicle ramp, said pivotally mounted vehicle ramp cover having a slot along its non-hinged edge corresponding with said lifting channel for receiving a tine of a forklift through said slot into said channel;

(b) selecting a desired number of protector sections from said plurality of variously configured protector sections, each selected protector section having a desired configuration;

(c) moving said selected number of protector sections of said desired configuration to a desired location;

(d) connecting each said selected protector section as desired, raceway to raceway, to provide a system of selected protector sections, said system having a continuous raceway of a desired configuration;

(e) lifting said cover on each said selected protector section of said system of selected protector sections forming said continuous raceway;

(f) placing service lines in said continuous raceway of said system of said selected protector sections; and (g) closing each said cover of each said selected protector section of said system of selected protector sections as may be desired.

17. The method of claim 16 wherein said step of moving said selected number of protector sections of said desired configuration to a desired location includes the additional steps of:

(a) providing a forklift, said forklift having forklift tines; and (b) placing one of said tines of said forklift into said slot of said hinged vehicle ramp cover into said lifting channel of each said selected protector section, and (c) lifting each said selected protector section with said forklift.

18. The method of claim 17 further comprising the additional steps of:

(a) removing said service lines from each said selected protector section of said system of selected protector sections as may be desired; and (b) disconnecting each said selected protector section of said system of selected protector sections as may be desired.

19. The method of claim 18 wherein said plurality of variously configured protector sections are selected from a group of protector sections configured to provide linear raceway sections, ninety degree turn raceway sections, forty-five degree turn raceway sections, twenty-two and one-half degree turn raceway sections and T-intersection raceway sections.

20. The method of claim 19 wherein said first and second inclined vehicle ramps are pivotally mounted to said frame.

* * * * *